(12) United States Patent
Horng et al.

(10) Patent No.: US 8,414,274 B2
(45) Date of Patent: Apr. 9, 2013

(54) HEAT DISSIPATING FAN

(75) Inventors: Alex Horng, Kaohsiung (TW); Tso-Kuo Yin, Kaohsiung (TW)

(73) Assignee: Sunonwealth Electric Machines Industry Co., Ltd., Kaohsiung (TW)

( * ) Notice: Subject to any disclaimer, the term of this patent is extended or adjusted under 35 U.S.C. 154(b) by 754 days.

(21) Appl. No.: 12/610,474

(22) Filed: Nov. 2, 2009

(65) Prior Publication Data

US 2011/0103981 A1     May 5, 2011

(51) Int. Cl.
*F04D 29/52*     (2006.01)
(52) U.S. Cl. ............ 417/423.14; 417/353; 415/220
(58) Field of Classification Search .......... 415/220, 415/222; 417/353, 366, 423.1, 423.14
See application file for complete search history.

(56) References Cited

U.S. PATENT DOCUMENTS

| | | | |
|---|---|---|---|
| 5,997,267 A * | 12/1999 | Lee | 417/423.7 |
| 7,234,919 B2 | 6/2007 | Lee et al. | |
| 2006/0045736 A1 | 3/2006 | Lee et al. | |
| 2006/0192450 A1 | 8/2006 | Hsieh | |

FOREIGN PATENT DOCUMENTS

NZ     198423     * 5/1984

* cited by examiner

*Primary Examiner* — Charles Freay
*Assistant Examiner* — Philip Stimpert
(74) *Attorney, Agent, or Firm* — Alan Kamrath; Kamrath IP Lawfirm, P.A.

(57) ABSTRACT

A heat dissipating fan includes a housing having an air inlet and an air outlet between which an air passageway is formed. A fixed seat is provided in the air passageway and includes first positioning holes. A magnetically conductive first casing includes a first outer wall, an extended wall extending radially outward from an end of the first outer wall and having second positioning holes aligned with the first positioning holes, and a first support on the other end of the first outer wall. A second casing is coupled to an inner periphery of the extended wall of the first casing. A motor mounted in the first and second casings includes a stator and a circuit board electrically connected to the stator.

20 Claims, 6 Drawing Sheets

HEAT DISSIPATING FAN

BACKGROUND OF THE INVENTION

1. Field of the Invention

The present invention relates to a heat dissipating fan and, more particularly, to a heat dissipating fan capable of easily processing, manufacturing, and assembling.

2. Description of the Related Art

Figure 1:
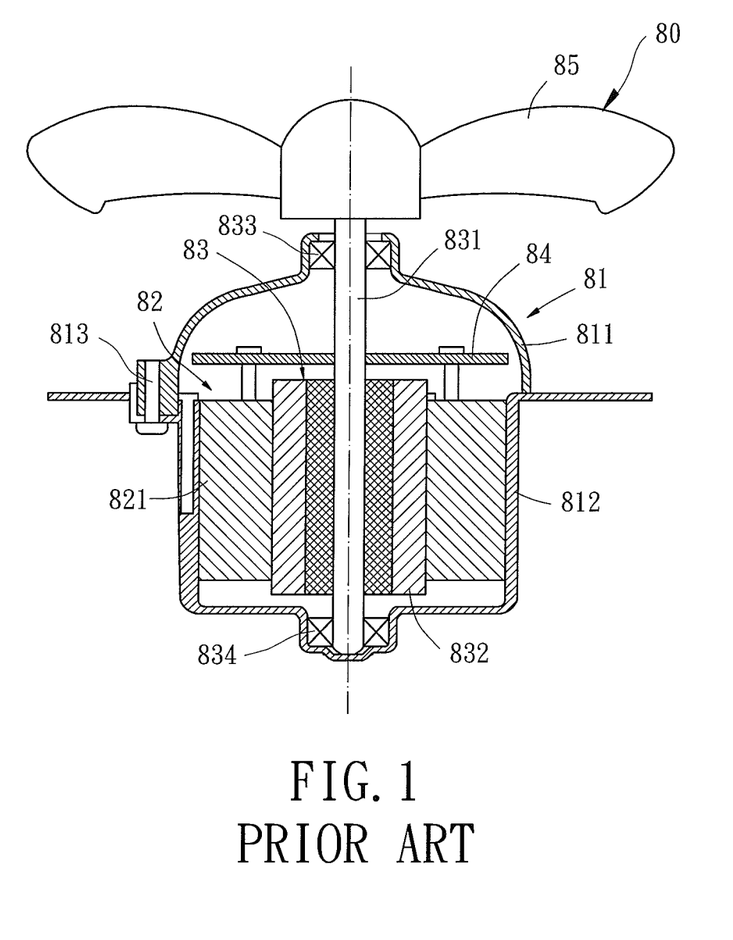
FIG. 1 shows a cross sectional view of a conventional heat dissipating fan.

FIG. 1 shows a conventional heat dissipating fan 80 including a housing 81, a stator 82, a rotor 83, a driving device 84, and an impeller 85. The housing 81 consists of first and second housing parts 811 and 812 fixed together by fasteners 813 such as screws or rivets. The stator 82 includes a magnetically conductive element 821. The rotor 83 includes a shaft 831 and a magnetic element 832. The shaft 831 extends through the housing 81 and is rotatably supported by first and second bearings 833 and 834. The magnetic element 832 is mounted around the shaft 831 and aligned with the magnetically conductive element 821. The driving device 84 is electrically connected to the magnetically conductive element 821. The impeller 85 is coupled to the shaft 831 and located outside of the housing 81. The driving device 84 can control the direction of electric current of the magnetically conductive element 821 to magnetically interact with the magnetic element 832 for driving the rotor 83 and the impeller 85 to rotate. However, the heat dissipating fan 80 does not include an outer casing, such that air currents generated by rotation of the impeller 85 can not be effectively guided to the heat generating portion of the electronic product, failing to provide a satisfactory heat dissipating effect.

Figure 2:
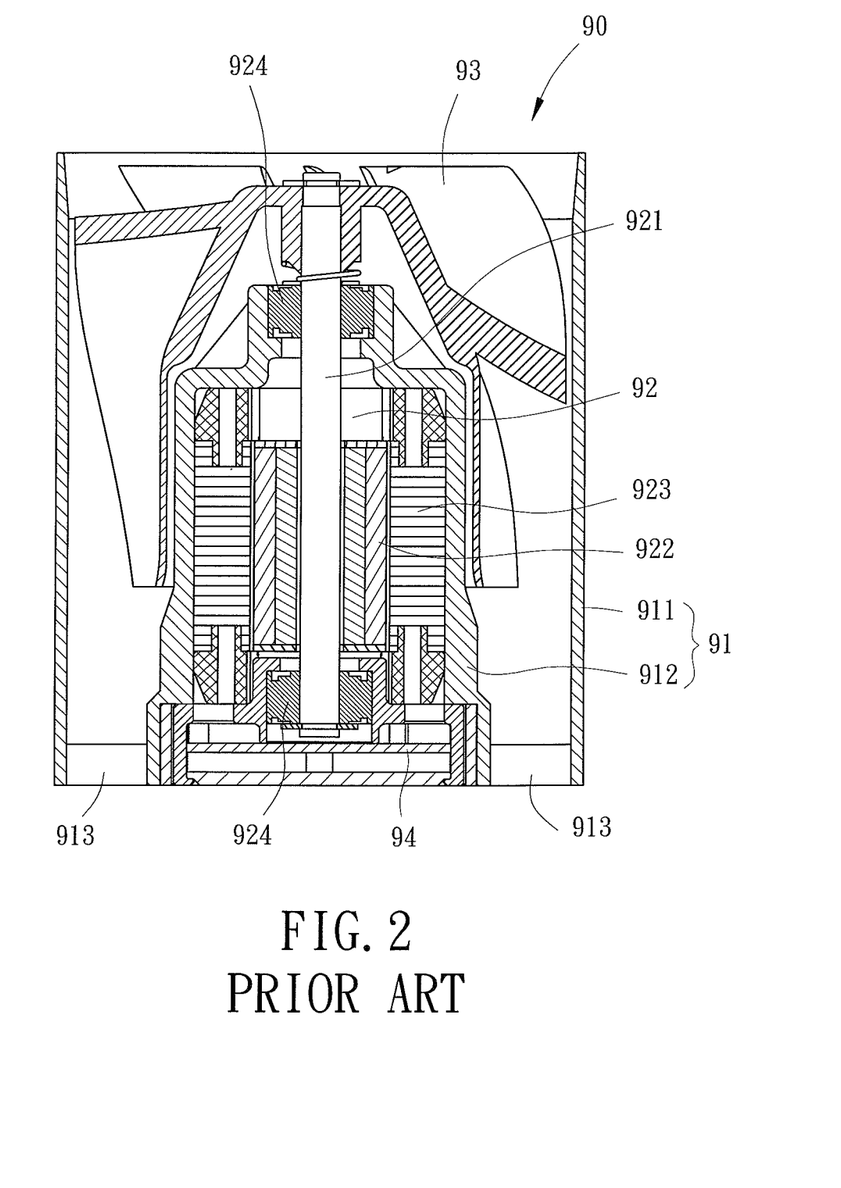
FIG. 2 shows a cross sectional view of another conventional heat dissipating fan.

FIG. 2 shows another conventional heat dissipating fan 90 including a housing 91, a motor 92, an impeller 93, and a circuit board 94. The housing 91 includes a housing portion 911 and a motor casing 912 formed of plastic material by injection molding. The motor casing 912 is located in the housing portion 911 and interconnected by connecting members 913 in the form of ribs to the housing portion 911. The motor 92 is mounted in the motor casing 912 and includes a shaft 921, a magnetic element 922, and a stator 923. The shaft 921 is rotatably supported by two bearings 924 and has an end extending beyond the motor casing 912. The magnetic element 922 is mounted to the shaft 921 and aligned with the stator 923. The impeller 93 is mounted to the end of the shaft 921 and located outside of the motor casing 912. The circuit board 94 is electrically connected to the stator 923. The motor 92 can drive the impeller 93 to rotate for providing heat dissipating functions. The housing 91 formed by injection molding guides the air currents generated by rotation of the impeller 93. However, the motor casing 912 of the housing 91 made of plastic material can not provide a magnetically sealing function while the stator 923 magnetically interacts with the magnetic element 922 under control of the circuit board 94. Thus, flux leakage is liable to occur, and electromagnetic interference occurs, leading to adverse affect to the operational effect of the impeller 93 and to the heat dissipating effect of the heat dissipating fan 90. Furthermore, it is difficult to install the magnetic element 922, the stator 923, and the circuit board 94 in the housing portion 911 and the motor casing 912, particularly when the housing 91, the motor 92, and the impeller 93 are of larger sizes. Further, it is difficult and expensive to manufacture a metal housing 91 of a larger size.

SUMMARY OF THE INVENTION

The primary objective of the present invention is to provide a heat dissipating fan with an enhanced heat dissipating effect.

Another objective of the present invention is to provide a heat dissipating fan that is easy to process, manufacture, and assemble at low costs.

A further objective of the present invention is to provide a heat dissipating fan with an improved assembling precision.

Still another objective of the present invention is to provide a heat dissipating fan suitable for housings of large sizes or made of metal.

Yet another objective of the present invention is to provide a heat dissipating fan which can effectively reduce flux leakage and suppress electromagnetic interference.

A heat dissipating fan according to one aspect of the present invention includes a housing having an air inlet and an air outlet spaced from the air inlet in an axial direction. An air passageway is formed between the air inlet and the air outlet. A fixed seat is provided in the air passageway and interconnected to the housing. The fixed seat includes a plurality of first positioning holes extending in the axial direction. A first casing made of magnetically conductive material includes a first outer wall having first and second ends. An extended wall is formed at the first end of the first outer wall. The extended wall and the first outer wall have different diameters to form a shoulder having a plurality of second positioning holes aligned with the plurality of first positioning holes. The first casing and the housing engage each other by using a plurality of fasteners. A first support is located on the second end of the first outer wall. A second casing is coupled to an inner periphery of the extended wall of the first casing. The second casing includes a second support. A motor is mounted in the first and second casings. The motor includes a rotor, a stator, and a circuit board. The rotor includes a shaft and a magnetic element. The shaft is rotatably supported by the first and second supports. An impeller is coupled to the shaft. The magnetic element is aligned with the stator. The circuit board is electrically connected to the stator.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "inner", "outer", "end", "portion", "section", "axial", "radial", "outward", "bottom", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 3:
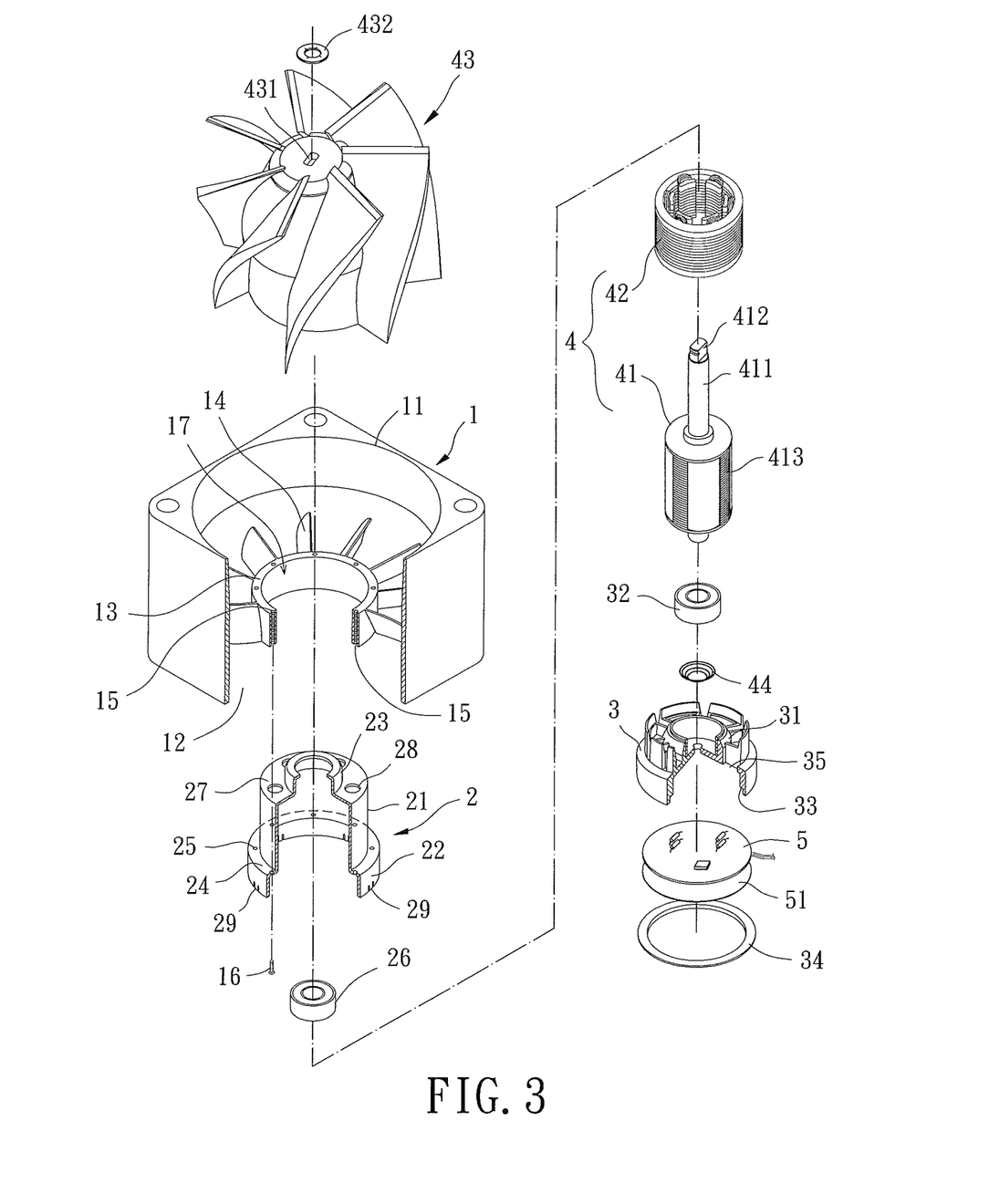
FIG. 3 shows an exploded, perspective view of a heat dissipating fan of a first embodiment according to the preferred teachings of the present invention.
Figure 4:
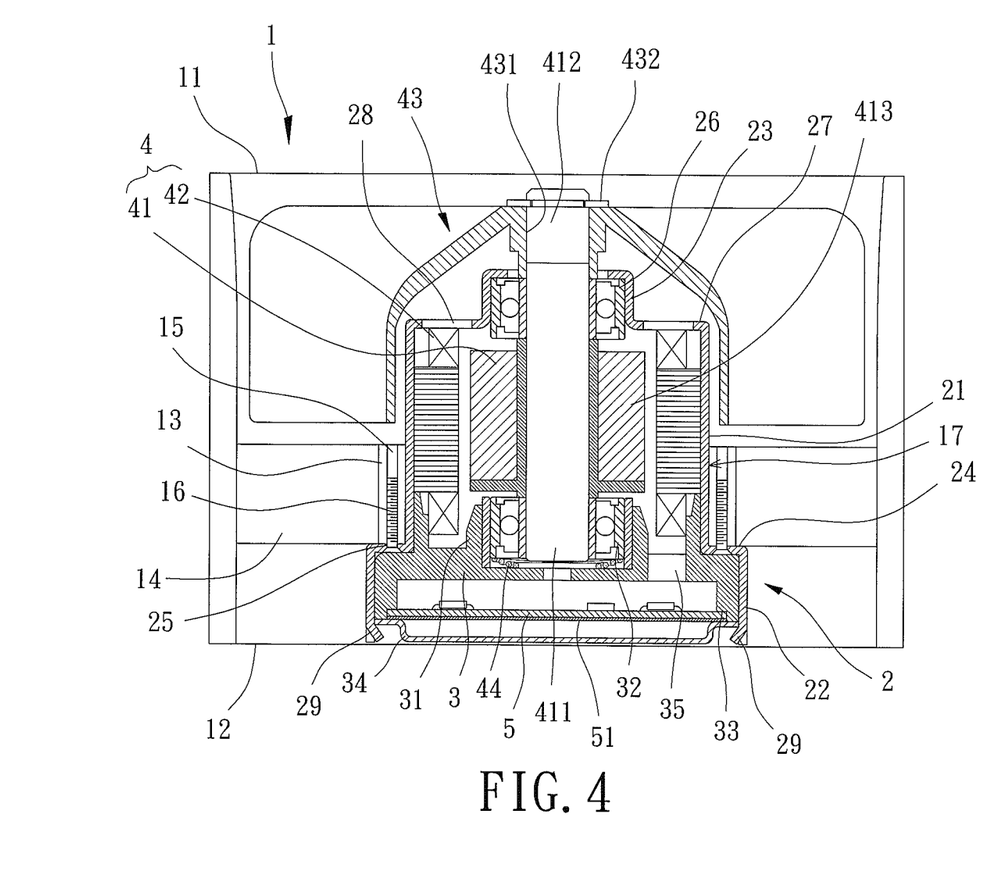
FIG. 4 shows a cross sectional view of the heat dissipating fan of FIG. 3.

FIGS. 3 and 4 show a heat dissipating fan of a first embodiment according to the preferred teachings of the present invention. The heat dissipating fan includes a housing 1, a first casing 2, a second casing 3, a motor 4, and a circuit board 5. The first casing 2 is received in the housing 1 and coupled to the second casing 3 for jointly receiving the motor 4. The circuit board 5 electrically connects with and controls the motor 4 to drive an impeller 43 to rotate, such that air current generated by rotation of the impeller 43 can be guided and concentrated by the housing 1.

The housing 1 is made of plastic material or metal and includes an air inlet 11 and an air outlet 12 communicated with the air inlet 11 to form an air passageway for receiving a fixing seat 13. The fixing seat 13 includes a through-hole 17, while a plurality of connecting members 14 radially extends between an outer periphery of the fixing seat 13 and an inner periphery of the housing 1. Each connecting member 14 can be formed of a rib or a stationary blade, and the fixing seat 13 has enough dimensions in axial and radial directions to form a plurality of axially extended first positioning holes 15 for a plurality of fasteners 16 to engage. Preferably, the first positioning holes 15 are screw holes, and the fasteners 16 are screws correspondingly extend through the first positioning holes 15. Accordingly, the first casing 2 can be coupled to the fixing seat 13 by the first positioning holes 15 and fasteners 16.

The first casing 2 is a hollow casing made of magnetically conductive material and, preferably, made of metal by punching or milling, so that the first casing 2 has an inner periphery in the form of a true circle. The first casing 2 includes a first outer wall 21 closely fitting the through-hole 17. In the first embodiment of the present invention, the first outer wall 21 and the through-hole 17 are both formed as true circles in cross section. The first casing 2 further includes an extended wall 22 and a first support 23 respectively formed at axially opposite ends. The extended wall 22 and the first outer wall 21 have different diameters to form a shoulder 24. The shoulder 24 can include a plurality of second positioning holes 25 aligned with the first positioning holes 15, so that the fasteners 16 can fix the first casing 2 to the housing 1. The first support 23 receives and supports a first bearing 26. The first support 23 and the first outer wall 21 have different diameters to form a shoulder 27. The shoulder 27 can include a plurality of heat dissipating holes 28. Further, the extended wall 22 of the first casing 2 includes a plurality of positioning portions 29 indented toward an axis of the first casing 2.

The second casing 3 includes an outer periphery closely fitting the extended wall 22 of the first casing 2. The second casing 3 further includes a second support 31 for receiving and supporting a second bearing 32 and an abutting portion 33 having two sides for respectively abutting against the circuit board 5 and a cover plate 34. The cover plate 34 is substantially cup-shaped for enhancing a heat dissipating effect of the circuit board 5. Further, the second casing 3 further provides a plurality of heat dissipating holes 35 for heat exhausting and allowing power lines to extend through.

The motor 4 is mounted in the first and second casings 2 and 3 and includes a rotor 41 and a stator 42. The rotor 41 is rotatably received in the stator 42 and includes a shaft 411 and a magnetic element 413. The shaft 411 includes first and second ends. The first end of the shaft 411 is extended through the first bearing 26 and coupled to the impeller 43 for driving the impeller 43 to rotate synchronously. In the preferred forms shown in FIGS. 3-6, the first end of the shaft 411 has a coupling portion 412 with non-circular cross sections and is engaged with a non-circular coupling portion 431 of the impeller 43 and retained in place by a retainer 432. If necessary, a cushioning member 44 such as a spring can be mounted around the shaft 411 to avoid the impeller 43 from pressing against the first bearing 26. The second end of the shaft 411 extends through the second bearing 32. Thus, the two ends of the shaft 411 are respectively coupled to the first and second bearings 26 and 32 such that the shaft 411 can rotate about a common axis passing through the centers of the first and second bearings 26 and 32. The magnetic element 413 is fixed to an outer periphery of the shaft 411 and aligned with the stator 42.

The circuit board 5 is arranged between the abutting portion 33 of the second casing 3 and the cover plate 34. In the preferred form shown in FIG. 3, one side of the circuit board 5 abuts against the abutting portion 33 of the second casing 3, and another side thereof abuts against the cover plate 34. Further, an insulating plate 51 is provided between the circuit board 5 and the cover plate 34 of metal for preventing a short circuit.

With reference to FIG. 4, in assembly of the heat dissipating fan of the first embodiment according to the teachings of the present invention, the first bearing 26 is fixed in the first support 23 of the first casing 2, and the stator 42 of the motor 4 is mounted into the first casing 2 in a fixed position relative to the first outer wall 21. Then, the first casing 2 is mounted to the fixing seat 13 of the housing 1 by the fasteners 16. Next, the first end of the shaft 411 is extended through the first bearing 26 and coupled to the impeller 43. The second bearing 32 is received into the second support 31 of the second casing 3. Then, the second casing 3 is fixed to the extended wall 22 of the first casing 2, while the second end of the shaft 411 extends through the second bearing 32. Thereafter, the circuit board 5 and the cover plate 34 are sequentially mounted to the second casing 3, and the plurality of positioning portions 29 is bent toward the axis of the first casing 2 by punching for fastening the circuit board 5 and the cover plate 34. The heat dissipating fan of the first embodiment according to the teachings of the present invention is, thus, constructed.

The housing 1 of the heat dissipating fan of the first embodiment according to the teachings of the present invention can guide the air currents driven by the impeller 43. Since the housing 1 is made of plastic material or metal, the present invention can fulfill the need of manufacturing heat dissipating fans of larger sizes while allowing easy processing and assembly of the heat dissipating fans. Furthermore, the first casings 2 made of magnetically conductive material can provide a magnetically conducting effect to avoid flux leakage and electromagnetic interference. Further, the manufacturing and processing methods of the first and second casings 2 and 3 allow the first and second casings 2 and 3 to be tightly and fixedly mounted to the fixing seat 13. Moreover, because the first outer wall 21, the extended wall 22, and the first support 23 are coaxially formed, when the outer periphery of the second casing 3 is tightly engaged within the first casing 2, assembling precision between the first and second casings 2 and 3 is improved.

Figure 5:
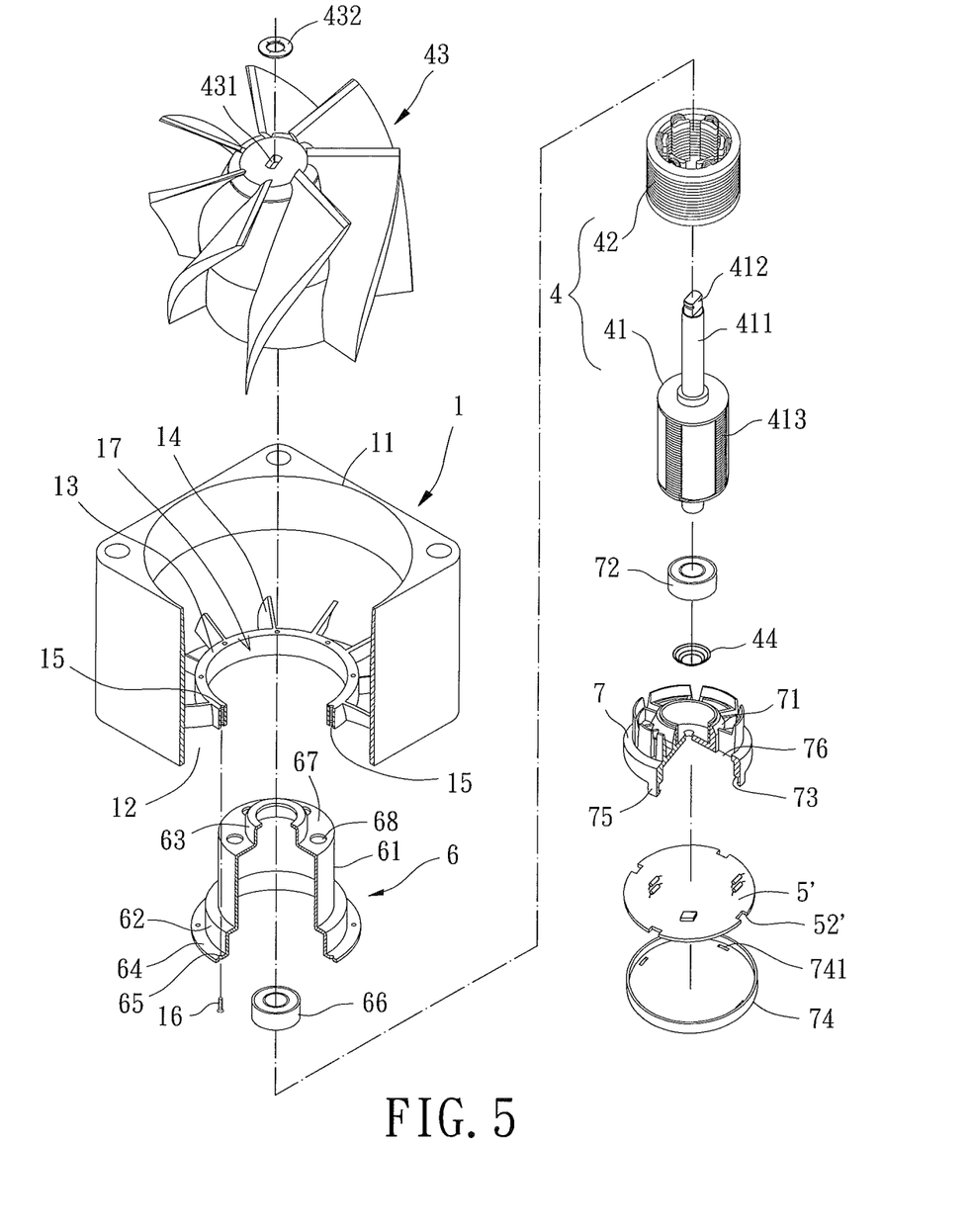
FIG. 5 shows an exploded, perspective view of a heat dissipating fan of a second embodiment according to the preferred teachings of the present invention.

FIG. 5 shows a heat dissipating fan of a second embodiment according to the teachings of the present invention including the housing 1 disclosed in the first embodiment, a first casing 6, a second casing 7, a motor 4 and a circuit board 5'. The motor 4 is substantially the same as that of the first embodiment, so details of which are not described to avoid redundancy.

In the preferred forms of the second embodiment, the first casing 6 is a hollow casing also made of magnetically conductive material and, preferably, made of metal by punching or milling, so that the first casing 6 has an inner periphery in the form of a true circle. The first casing 6 includes a first outer wall 61 and an extended wall 62 formed at one end of the first outer wall 61. An outer periphery of the extended wall 62 has a shape, preferably in the form of a circle, corresponding to the fixing seat 13, such that the extended wall 62 of the first casing 6 can be tightly fixed to the through-hole 17 of the housing 1. A flange 64 is provided at a bottom side of the first casing 6 and, preferably, radially extended from one end of the extended wall 62. The flange 64 includes a plurality of second positioning holes 65 aligned with the first positioning holes 15, so that the fasteners 16 can fix the first casing 6 to the housing 1. The first casing 6 further includes a first support 63 formed at one end of the first casing 6 opposite to the extended wall 62 to receive and hold a first bearing 66. The first support 63 and the first outer wall 61 have different diameters to form a shoulder 67 preferably including a plurality of heat dissipating holes 68.

The second casing 7 has an outer periphery tightly engaged with an inner periphery of the extended wall 62 of the first casing 6. The second casing 7 includes a second support 71 for receiving and holding a second bearing 72. The second casing 7 further includes an abutting portion 73 for abutting against one side of the circuit board 5', while a cover plate 74 abuts against another side of the circuit board 5'. Specifically, the cover plate 74 made of plastic material includes a plurality of engaging holes 741, and the second casing 7 further includes a plurality of engaging members 75 extended through and engaged with edges of the engaging holes 741 of the cover plate 74. The second casing 7 can also provide a plurality of heat dissipating holes 76 having functions similar to those provided by the heat dissipating holes 35 of the second casing 3 disclosed in the first embodiment.

The circuit board 5' is arranged between the second casing 7 and the cover plate 74. The circuit board 5' electrically connects to the stator 42 and further provides a plurality of positioning holes 52' in a flange position of the circuit board 5' so that the engaging members 75 can extend through the positioning holes 52'.

Figure 6:
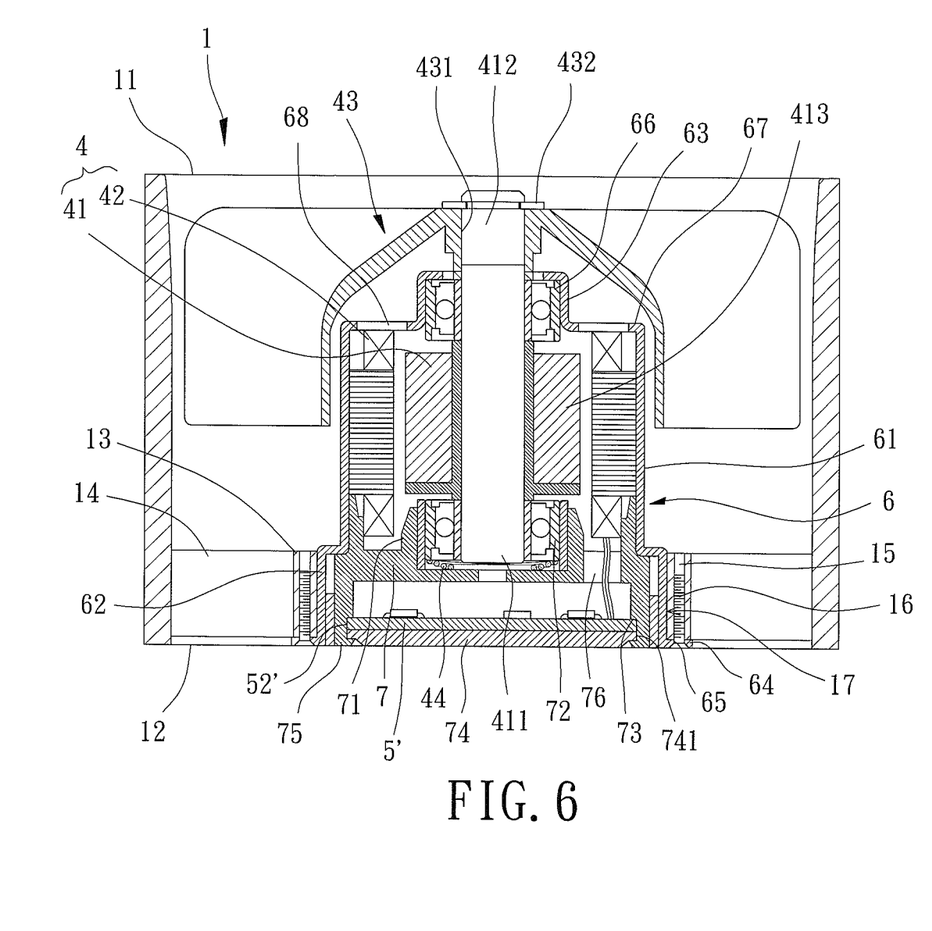
FIG. 6 shows a cross sectional view of the heat dissipating fan of FIG. 5.

Referring to FIG. 6, in assembly, what is different between the first and second embodiments is illustrated in detail as the following. Instead of the first outer wall 21 that closely fits the through-hole 17 in the first embodiment, what closely fits the through-hole 17 is the extended wall 62 of the first casing 6. Further, the fasteners 16 are extended through and fixed to the second positioning holes 65 and the first positioning holes 15 of the fixing seat 13, so that the first casing 6 can be fixed to the housing 1.

The functions and effect provided by the heat dissipating fan of the second embodiment according to the teachings of the present invention are the same as those of the heat dissipating fan of the first embodiment according to the teachings of the present invention. Furthermore, the heat dissipating fan of the second embodiment according to the teachings of the present invention can be easily assembled at the same time.

Since the heat dissipating fans according to the teachings of the present invention include a housing 1 for guiding the air currents driven by the impeller 43 to flow in a predetermined direction, the heat dissipating effect is enhanced. Furthermore, since the first casing 2 and the housing 1 can be manufactured separately and then assembled easily, the manufacturing costs are cut. Further, separate manufacture of the first casing 2 and the housing 1 also allows manufacture of heat dissipating fans of larger sizes or having metal housings 1. Further, the first casing 2 and second casing 3 are manufactured by punching or milling, and, thereby, the assembling effect of the combination between the first and second casing 2 and 3 is enhanced. Furthermore, the first casing 2 made of magnetically conductive material can provide a magnetically sealing effect to avoid magnetic leakage and electromagnetic interference.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A heat dissipating fan comprising:
a housing including an air inlet and an air outlet communicated with the air inlet, with an air passageway formed between the air inlet and the air outlet, with a fixed seat provided in the air passageway, with the fixed seat interconnected by a plurality of connecting members to the housing, with the fixed seat including a through-hole and a plurality of first positioning holes extending in an axial direction;
a first casing made of magnetically conductive material, with the first casing including a first outer wall having first and second ends, with the first outer wall of the first casing closely fitting the through-hole of the fixed seat, with an extended wall formed at the first end of the first outer wall, with the extended wall and the first outer wall having different diameters to form a shoulder having a plurality of second positioning holes aligned with the first positioning holes, with the first casing and the housing coupling with each other by a plurality of fasteners, with a first support formed at the second end of the first outer wall;
a second casing coupled to an inner periphery of the extended wall of the first casing, with the second casing including a second support;
a motor mounted in the first casing, with the motor including a rotor and a stator, with the rotor including a shaft and a magnetic element, with the shaft rotatable supported by the first and second supports, with an impeller coupled to the shaft, with the magnetic element aligned with the stator; and
a circuit board electrically connected to the stator.

2. The heat dissipating fan as defined in claim 1, with the first support of the first casing coupled to a first bearing, with the second support of the second casing coupled to a second bearing.

3. The heat dissipating fan as defined in claim 1, with the first outer wall of the first casing and the through-hole of the fixed seat formed as true circles in cross section.

4. The heat dissipating fan as defined in claim 1, with the plurality of connecting members interconnected between the fixed seat and the housing being ribs.

5. The heat dissipating fan as defined in claim 1, with the plurality of connecting members interconnected between the fixed seat and the housing being stationary vanes.

6. The heat dissipating fan as defined in claim 1, with the second casing including an abutting portion having two sides for respectively abutting against the circuit board and a cover plate.

7. The heat dissipating fan as defined in claim 6, with the extended wall of the first casing including a plurality of positioning portions bent toward an axis of the first casing for fastening the circuit board and the cover plate.

8. The heat dissipating fan as defined in claim 1, with the first support and the first outer wall having different diameters to form a shoulder, with the shoulder including a plurality of heat dissipating holes.

9. The heat dissipating fan as defined in claim 1, with the second casing further including a plurality of heat dissipating holes.

10. A heat dissipating fan comprising:
a housing including an air inlet and an air outlet communicated with the air inlet, with an air passageway formed between the air inlet and the air outlet, with a fixed seat provided in the air passageway, with the fixed seat interconnected by a plurality of connecting members to the housing, with the fixed seat including a through-hole and a plurality of first positioning holes extending in an axial direction;
a first casing made of magnetically conductive material, with the first casing including a first outer wall having first and second ends, with the extended wall of the first casing closely fitting the through-hole of the fixed seat, with an extended wall formed at the first end of the first outer wall, with a flange radially extended from a bottom side of the first casing, with the flange including a plurality of second positioning holes aligned with the first positioning holes, with the first casing and the housing coupling with each other by a plurality of fasteners, with a first support formed at the second end of the first outer wall;
a second casing coupled to an inner periphery of the extended wall of the first casing, with the second casing including a second support;
a motor mounted in the first casing, with the motor including a rotor and a stator, with the rotor including a shaft and a magnetic element, with the shaft rotatably supported by the first and second supports, with an impeller coupled to the shaft, with the magnetic element aligned with the stator; and
a circuit board electrically connected to the stator.

11. The heat dissipating fan as defined in claim 10, with the first support of the first casing coupled to a first bearing, with the second support of the second casing coupled to a second bearing.

12. The heat dissipating fan as defined in claim 10, with the extended wall of the first casing and the through-hole of the fixed seat formed as true circles in cross section.

13. The heat dissipating fan as defined in claim 10, with the plurality of connecting members interconnected between the fixed seat and the housing being ribs.

14. The heat dissipating fan as defined in claim 10, with the plurality of connecting members interconnected between the fixed seat and the housing being stationary vanes.

15. The heat dissipating fan as defined in claim 10, with the second casing including an abutting portion having two sides for respectively abutting against the circuit board and a cover plate.

16. The heat dissipating fan as defined in claim 10, with the second casing coupled to an inner periphery of the extended wall of the first casing.

17. The heat dissipating fan as defined in claim 15, with the second casing further including a plurality of engaging members extended through and engaged with the cover plate.

18. The heat dissipating fan as defined in claim 17, with the circuit board including a plurality of positioning holes, with the engaging members extended through the positioning holes.

19. The heat dissipating fan as defined in claim 10, with the first support and the first outer wall having different diameters to form a shoulder, with the shoulder including a plurality of heat dissipating holes.

20. The heat dissipating fan as defined in claim 10, with the second casing further including a plurality of heat dissipating holes.

\* \* \* \* \*